(12) United States Patent
Lane (10) Patent No.: US 7,477,870 B2
(45) Date of Patent: Jan. 13, 2009

(54) INTERNET-BASED ELECTRONIC BOOKS

(75) Inventor: Courtney Lane, West Hollywood, CA (US)

(73) Assignee: Mattel, Inc., El Segundo, CA (US)

( * ) Notice: Subject to any disclaimer, the term of this patent is extended or adjusted under 35 U.S.C. 154(b) by 94 days.

(21) Appl. No.: 11/054,641

(22) Filed: Feb. 8, 2005

(65) Prior Publication Data
US 2005/0181344 A1 Aug. 18, 2005

Related U.S. Application Data

(60) Provisional application No. 60/544,537, filed on Feb. 12, 2004.

(51) Int. Cl.
*G09B 5/00* (2006.01)
(52) U.S. Cl. ..................... 434/317
(58) Field of Classification Search .............. 434/317
See application file for complete search history.

(56) References Cited

U.S. PATENT DOCUMENTS

| | | | |
|---|---|---|---|
| 5,114,291 A | 5/1992 | Hefty | |
| 5,761,681 A | 6/1998 | Huffman et al. | |
| 6,017,219 A | 1/2000 | Adams, Jr. et al. | |
| 6,052,717 A | 4/2000 | Reynolds et al. | |
| 6,283,858 B1 | 9/2001 | Hayes, Jr. et al. | |
| 6,319,010 B1 | 11/2001 | Kikinis | |
| 6,421,524 B1 * | 7/2002 | Padgett | 434/317 |
| 6,633,741 B1 * | 10/2003 | Posa et al. | 434/317 |
| 6,683,611 B1 * | 1/2004 | Cleveland | 345/471 |
| 6,985,913 B2 * | 1/2006 | Murata | 707/104.1 |
| 7,162,197 B2 * | 1/2007 | Kitamura | 434/317 |
| 2001/0032133 A1 | 10/2001 | Moran | |
| 2002/0024534 A1 | 2/2002 | Tenembaum | |
| 2002/0049847 A1 | 4/2002 | McArdle et al. | |
| 2002/0053089 A1 * | 5/2002 | Massey | 725/135 |
| 2002/0074727 A1 * | 6/2002 | Glaser | 273/429 |
| 2004/0197757 A1 * | 10/2004 | Musolf et al. | 434/308 |

OTHER PUBLICATIONS

Meyer, Anne and David H. Rose. "Learning to Read in the Computer Age." Brookline Books, Cambridge; 1998. Selected pages.
Disney Online Story Time—http://asp.disney.go.com/DisneyBooks/StoryTime.asp?id=2342.
Clifford Interactive Storybooks—http://teacher.scholastic.com/clifford1/.
Bing Puddlepot's Instant Custom Picture Book, printed Aug. 21, 2006.

* cited by examiner

*Primary Examiner*—Cameron Saadat
(74) *Attorney, Agent, or Firm*—Kolisch Hartwell, PC (57) ABSTRACT

An online reading system, and more particularly to a reading system that allows users to read, listen to, and/or interact with electronic stories in an online (typically, internet-based) environment. In some cases, the electronic stories may be customizable by the user, so that specific personal attributes of the user, such as the user's name, age, favorite animal, and other personal attributes and/or preferences may be incorporated into the story.

20 Claims, 8 Drawing Sheets

Customize Your Story !

What is your first name ? ▭ ~52

Are you a boy or a girl ? ▭ ~54

How old are you ? ▭ ~56

What's your favorite color ? ▭ ~58

What color are your eyes ? ▭ ~60

What color is your hair ? ▭ ~62

[ Submit ]

Customize Your Story !

How old are you ?
- ○ 4  ○ 7  ○ 10
- ○ 5  ⦿ 8  ○ 11   } 72
- ○ 6  ○ 9  ○ 12

What's your favorite color ?
- ○ blue    ○ yellow
- ○ red     ○ pink    } 74
- ⦿ green   ○ purple What color are your eyes ?
- ○ blue    ⦿ black
- ○ brown   ○ gray    } 76
- ○ green What color is your hair ?
- ○ brown   ⦿ red
- ○ blond             } 78
- ○ black

INTERNET-BASED ELECTRONIC BOOKS

CROSS REFERENCE TO RELATED APPLICATIONS

The present application claims priority from U.S. Provisional Patent Application Ser. No. 60/544,537, filed Feb. 12, 2004, incorporated herein by reference in its entirety for all purposes.

FIELD OF THE INVENTION

The present disclosure relates generally to an online reading system, and more particularly to a reading system that allows users to read, listen to, and/or interact with electronic stories in an online (typically, internet-based) environment. In some cases, the electronic stories may be customizable by the user, so that specific personal attributes of the user, such as the user's name, age, favorite animal, and other personal attributes and/or preferences may be incorporated into the story.

BACKGROUND OF THE INVENTION

Reading is an important and sometimes difficult skill for children to master, and numerous devices and techniques have been developed to assist children in learning to read. One common method of helping a child learn to read is by reading aloud to the child from a storybook, often while the child attempts to read the same words at the same time. This can be done using storybooks in hardcopy form, in which case an adult may read the storybook aloud to the child, and it can also be done in an online context, in which case a computer generated voice may "read" the storybook to the child. The online context has the advantage that no adult need be available, which may increase the child's opportunities to learn to read.

On the other hand, due to a lack of human interaction, it may in some cases be difficult to maintain a child's interest in and attention to reading activities in an online context. More specifically, simply placing traditional text and images online may be insufficient to hold the child's attention, and the child may turn to a less educational online activity. Therefore, it is desirable to provide an online reading system that has features designed to maintain a child's interest, and which still retains its educational value by helping the child to learn how to read.

Disclosures of online reading systems are found in U.S. patent application Ser. No. U.S. 2002/0024534 A1, and at internet sites www.storyplus.com and www.nickjr.com. Disclosures of customizable electronic text are found in U.S. Pat. Nos. 5,114,291 and 5,761,681. The disclosures of each of these documents are incorporated herein by reference. The advantages of the electronic reading system provided will be understood more readily after a consideration of the Drawings and the Detailed Description of the Preferred Embodiment.

DETAILED DESCRIPTION OF THE PREFERRED EMBODIMENT

Figure 1:
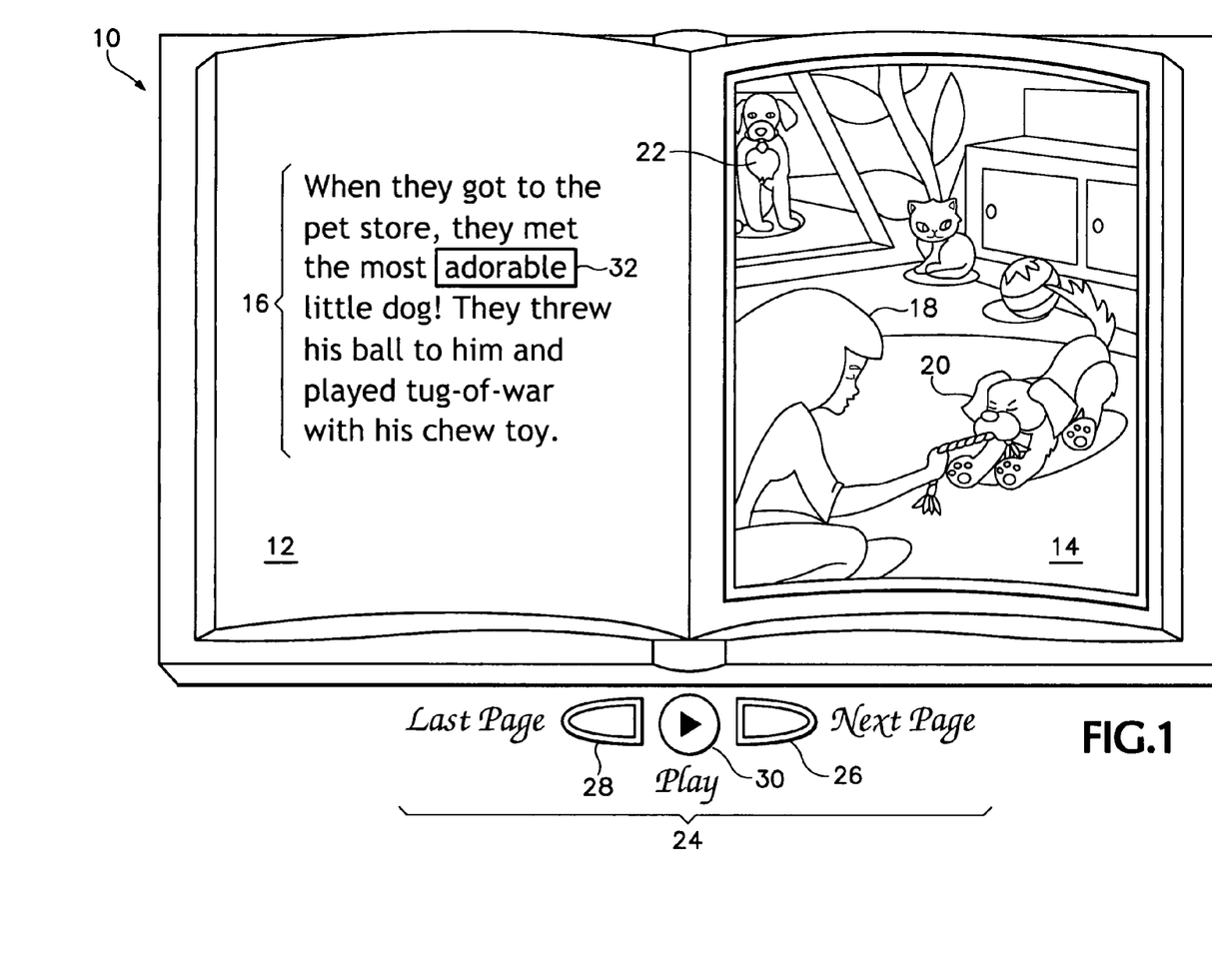
FIG. 1 depicts a graphical representation of two pages of an online storybook.

Referring to FIG. 1, an online storybook is depicted and indicated generally at 10. Storybook 10 includes at least two pages 12 and 14, and each page may include text as indicated generally at 16, and/or images such as images 18, 20, 22. Storybook 10 also may include a navigation mechanism, generally indicated at 24, configured to allow a user to navigate through selected pages of the storybook. The navigation mechanism may take any suitable form that allows a user to navigate through the selected pages in some fashion, for example using a computer mouse and/or a keyboard.

Navigation mechanism 24 of the embodiment depicted in FIG. 1 includes a graphical page forward icon 26, a graphical page backward icon 28, and a play icon 30. In the depicted embodiment, each of these icons is correlated to a function that is activated when the user positions a computer mouse cursor over the icon and clicks a mouse button. Specifically, clicking a mouse button when the cursor is positioned over page forward icon 26 causes the next available storybook pages to be displayed, clicking a mouse button when the cursor is positioned over page backward icon 28 causes the previous available storybook pages to be displayed, and clicking a mouse button when the cursor is positioned over play icon 30 causes a computer generated voice to "read" the text shown on the displayed pages.

Figure 2:
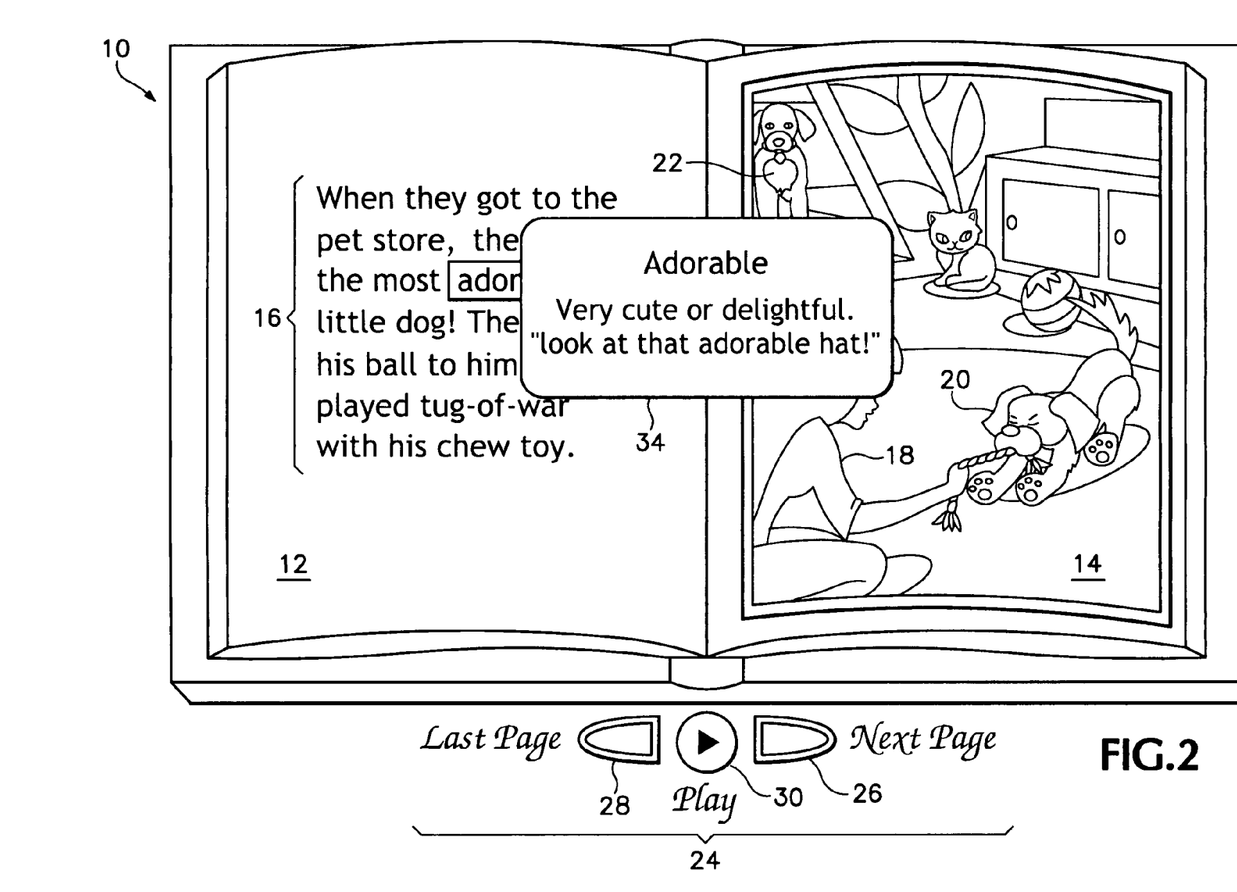
FIG. 2 depicts another graphical representation of the online storybook pages of FIG. 1, showing a definition of a word from the text being revealed.

Text 16 may include one or more highlighted words 32 that may be selected and/or activated with a mouse cursor, for instance by clicking on the word or in "rollover" fashion. Words 32 may be highlighted to indicate that additional features such as a definition, an example sentence, or a representative image are available for those words. For example, FIG. 2 shows storybook pages 12 and 14 after the highlighted word "adorable" has been selected by a user, activating a graphical "pop-up" box 34 containing a definition of the selected word and an example sentence using the word.

Figure 3:
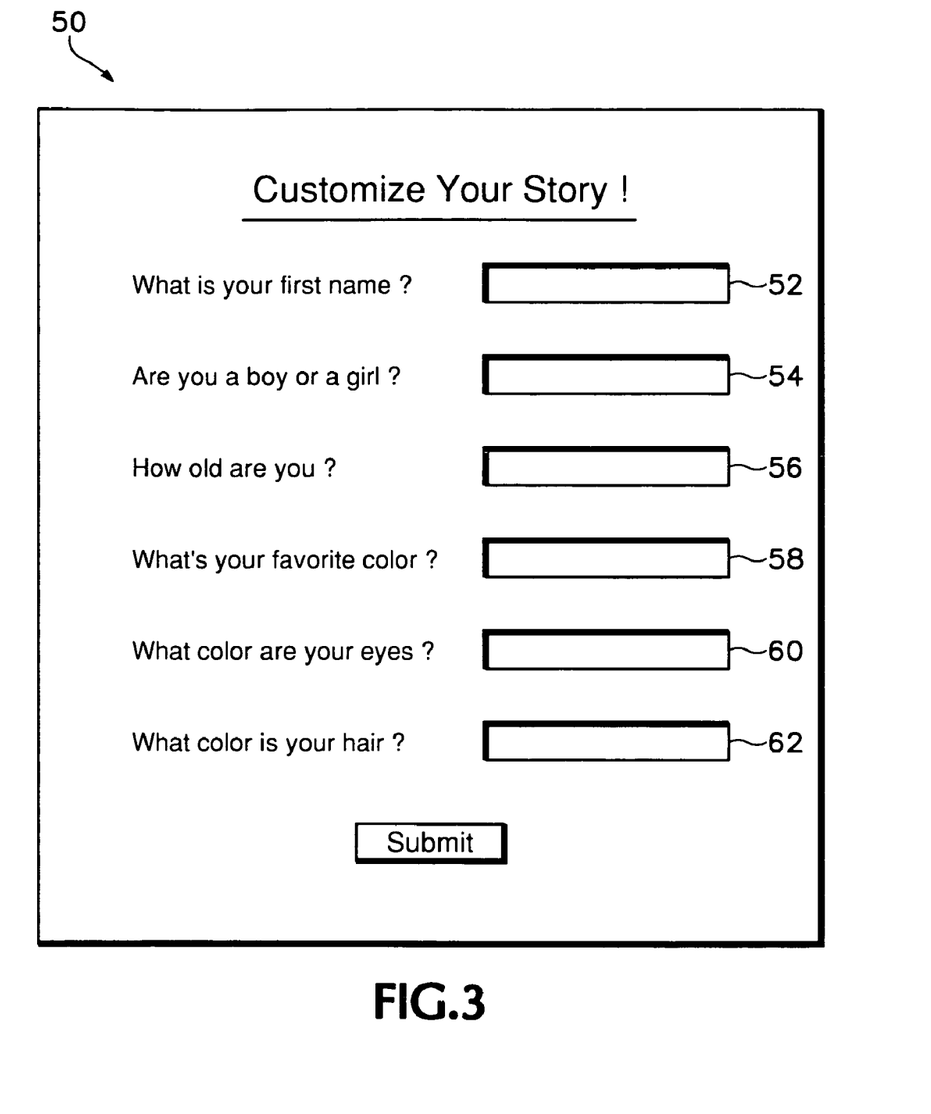
FIG. 3 depicts an online customization mechanism configured to allow a user to customize an online storybook.
Figure 4:
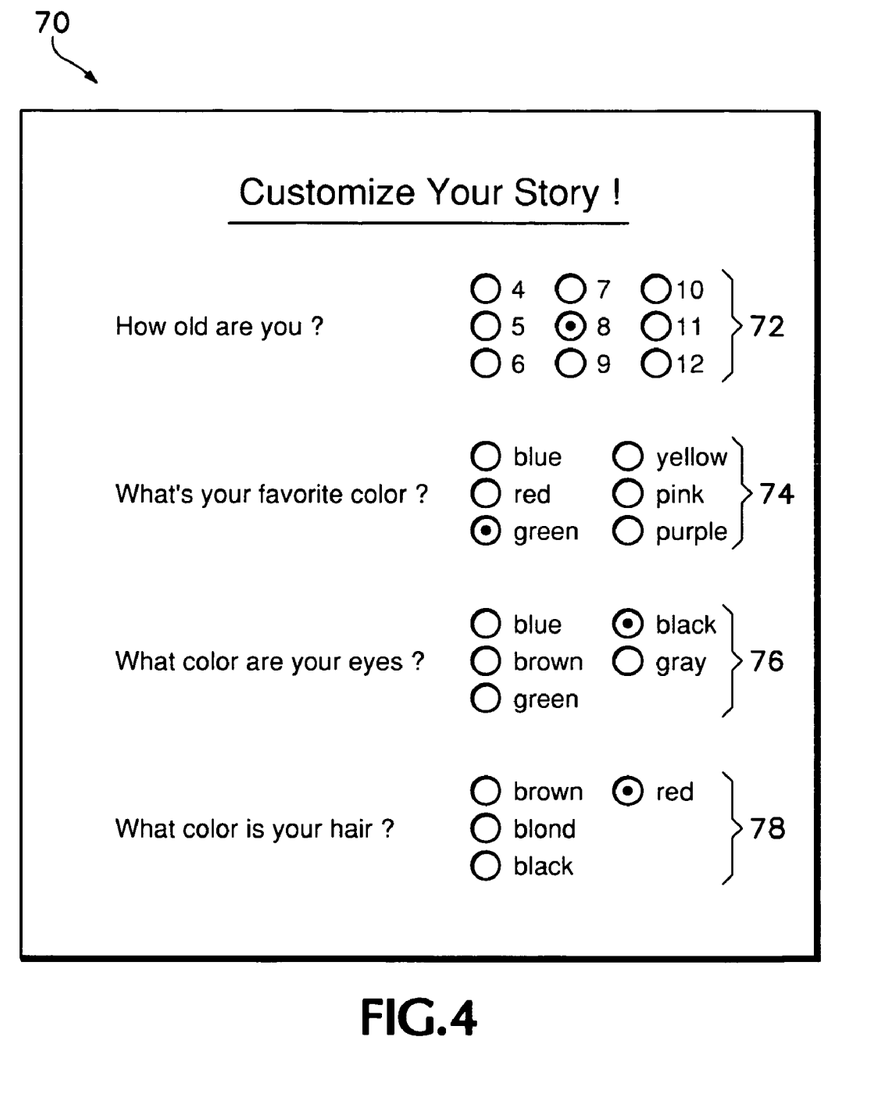
FIG. 4 depicts a graphical representation of an alternative embodiment of a customization mechanism configured to allow a user to customize an online storybook.

As depicted in FIGS. 3 and 4, storybook 10 may include a customization mechanism configured to allow a user to customize the storybook by including one or more attributes of the user in the text. These attributes may include the user's first name, favorite color, favorite animal, pet's name, and/or various physical attributes such as the user's age, eye color, or hair color, among others. The customization mechanism may take any suitable form that allows a user to communicate his or her personal attributes in an online context.

For example, FIG. 3 shows an embodiment of a customization mechanism 50 that is configured to allow the user to enter attributes alphanumerically using a computer keyboard. Customization mechanism 50 is an interactive graphical form presented to the user and containing one or more blanks in which the user may enter data. Specifically, in the depicted embodiment, the user may enter his or her first name in blank 52, sex (boy or girl) in blank 54, age in blank 56, favorite color in blank 58, eye color in blank 60, and hair color in blank 62.

These and any other suitable attributes may subsequently be incorporated into the storybook, as will be described below in more detail.

FIG. 4 shows an alternative embodiment of a customization mechanism 70 that is configured to allow the user to select attributes from one or more lists of attributes provided by the reading system. In this embodiment, the user may be presented with a number of questions and possible answers, to which the user may signify a response by using a mouse cursor to activate a radio button, check a box, or otherwise indicate a choice of answers. A customization mechanism of this type may be appropriate, for example, for a child who has not yet developed sufficient writing skills to type responses. Specifically, in the embodiment depicted in FIG. 4, the user may choose his or her age from a list of ages 72, his or her favorite color from a list of colors 74, the color of his or her eyes from a list of eye colors 76, and the color of his or her hair from a list of hair colors 78.

Similarly, in other embodiments there may be additional lists of attributes from which the user may choose, including the user's gender, favorite animal, other physical attributes and/or favorite things, among others. Still other embodiments may include a combination of features similar to those shown in FIGS. 3 and 4, i.e. a combination of alphanumeric and list-based customization. For example, in one alternate embodiment (not shown), the user may enter names (such as the user's own name and/or a favorite pet's name) alphanumerically, and then indicate other customization attributes using lists provided by the reading system.

Figure 5:
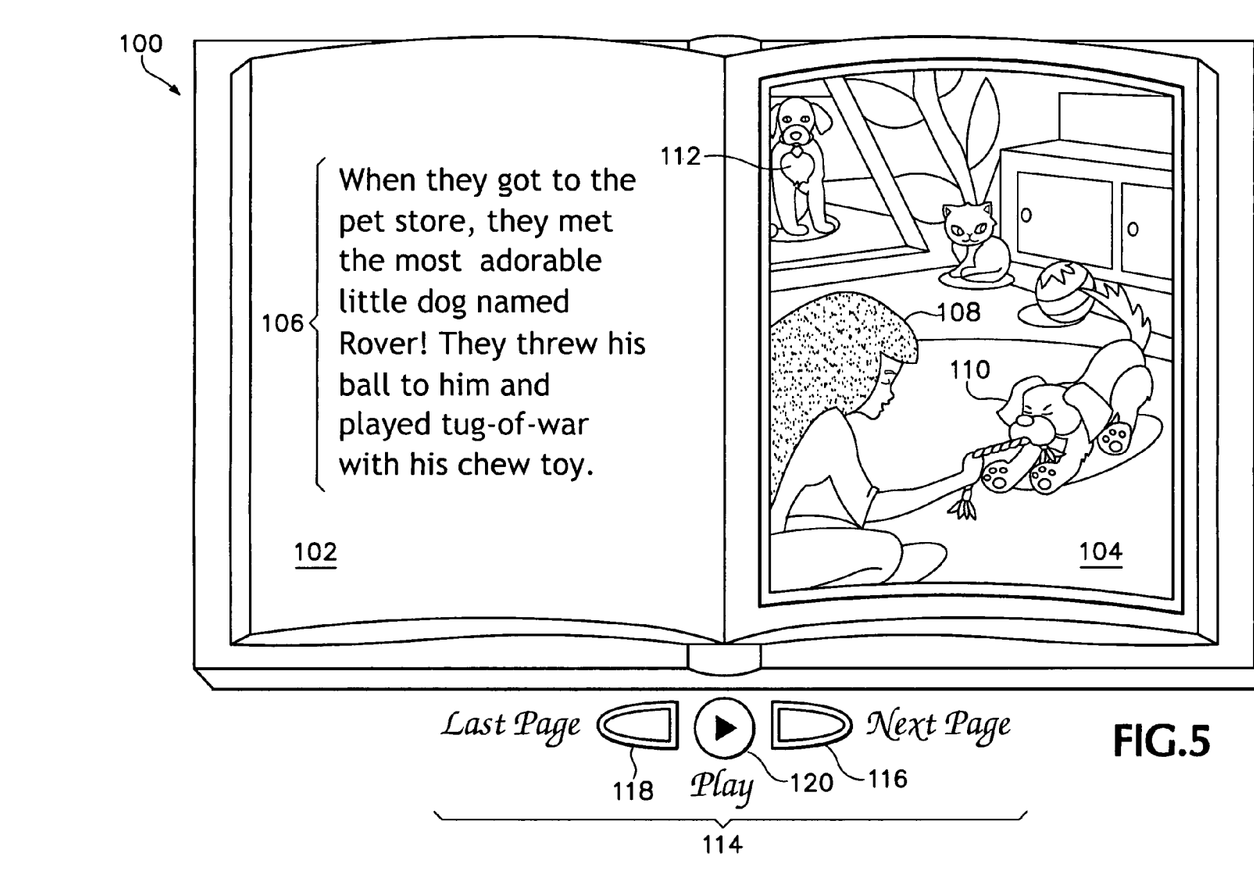
FIG. 5 depicts a graphical representation of two pages of an online storybook that has been customized to include various attributes of a user.

Once a user has selected one or more personal attributes as described above or in any other suitable manner, these attributes may be included in the text of the storybook in a manner that may increase the user's interest in the story. For example, FIG. 5 shows an online storybook 100 including graphical representations of two pages 102 and 104 that are similar to pages 12 and 14 shown in FIG. 1, but which have been customized to some extent. In this example, the user has previously indicated that her hair is red and that she has a pet dog named "Rover". As a result, text 106 has been customized to include the name "Rover", and image 108 has been customized to include red hair (indicated by shading in FIG. 5).

In similar fashion, text such as text 106 may be further customized by the addition of names or other words, and images such as images 108, 110, and 112 may be further customized by the addition of physical attributes and other user preferences such as colors and the like. Alternatively or in addition, in some other embodiments the story may be customized to include entirely new or different images and/or events based on the user's chosen attributes. Thus, the text and accompanying images of the storybook may include many aspects that specifically mirror or otherwise are correlated to attributes indicated by the user, potentially increasing the user's interest in reading the story.

Figure 6:
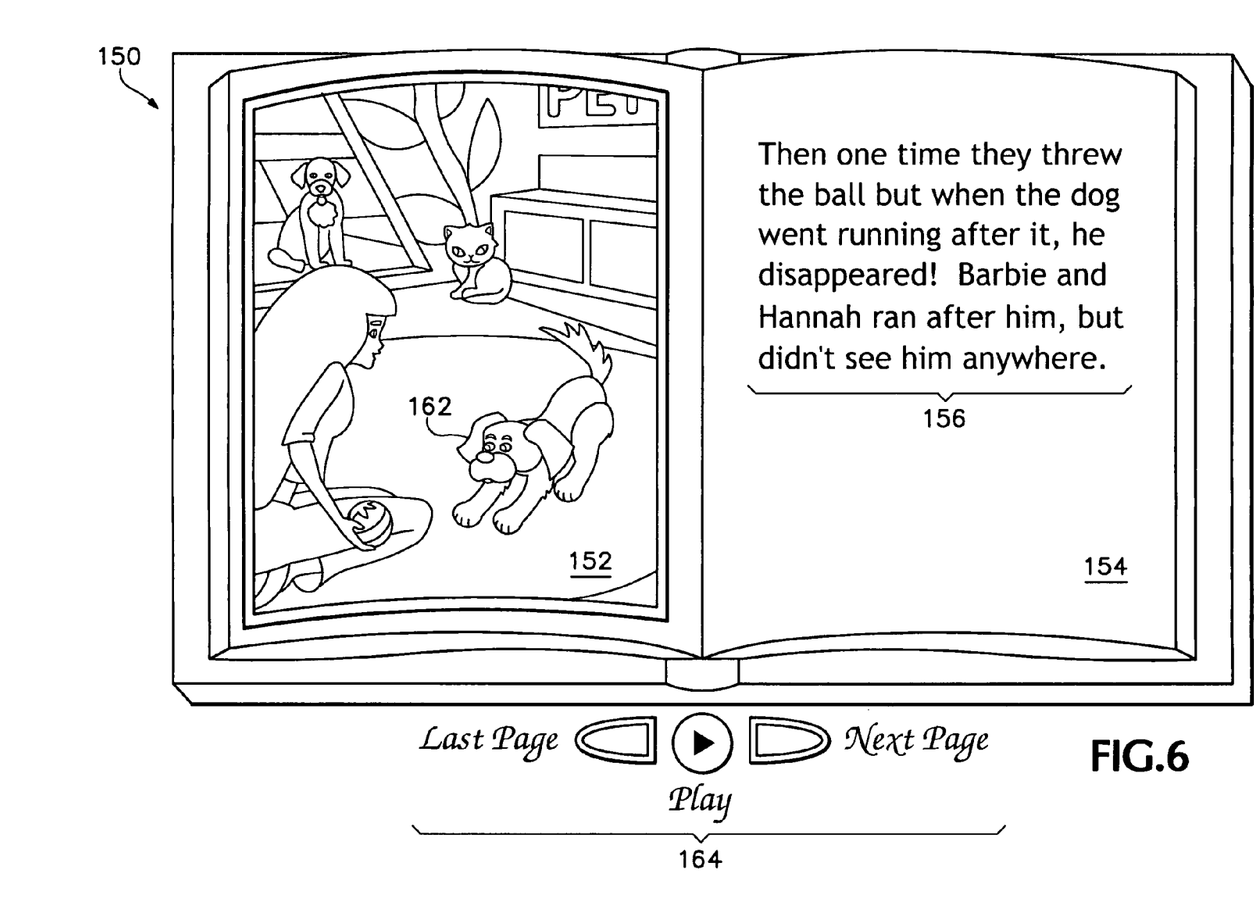
FIG. 6 depicts a graphical representation of two pages of an online storybook including an animated image.

An online storybook according to aspects of this disclosure may also include animated images whose animation is selectively triggered by the user. For example, FIG. 6 shows an embodiment of an online storybook 150, including graphical representations of two pages 152 and 154, text 156, images 158, 160, and 162, and navigation mechanism 164. In this embodiment, image 162 of the dog is an animated image with animation that may be selectively triggered by the user, for example by positioning a graphical cursor on the animated image and clicking a mouse button, or by pressing a key on a computer keyboard.

In this case, upon triggering the animation of animated image 162, the image of the dog will move so as to exit pages 152 and 154, in keeping with the events described by text 156.

Figure 7:
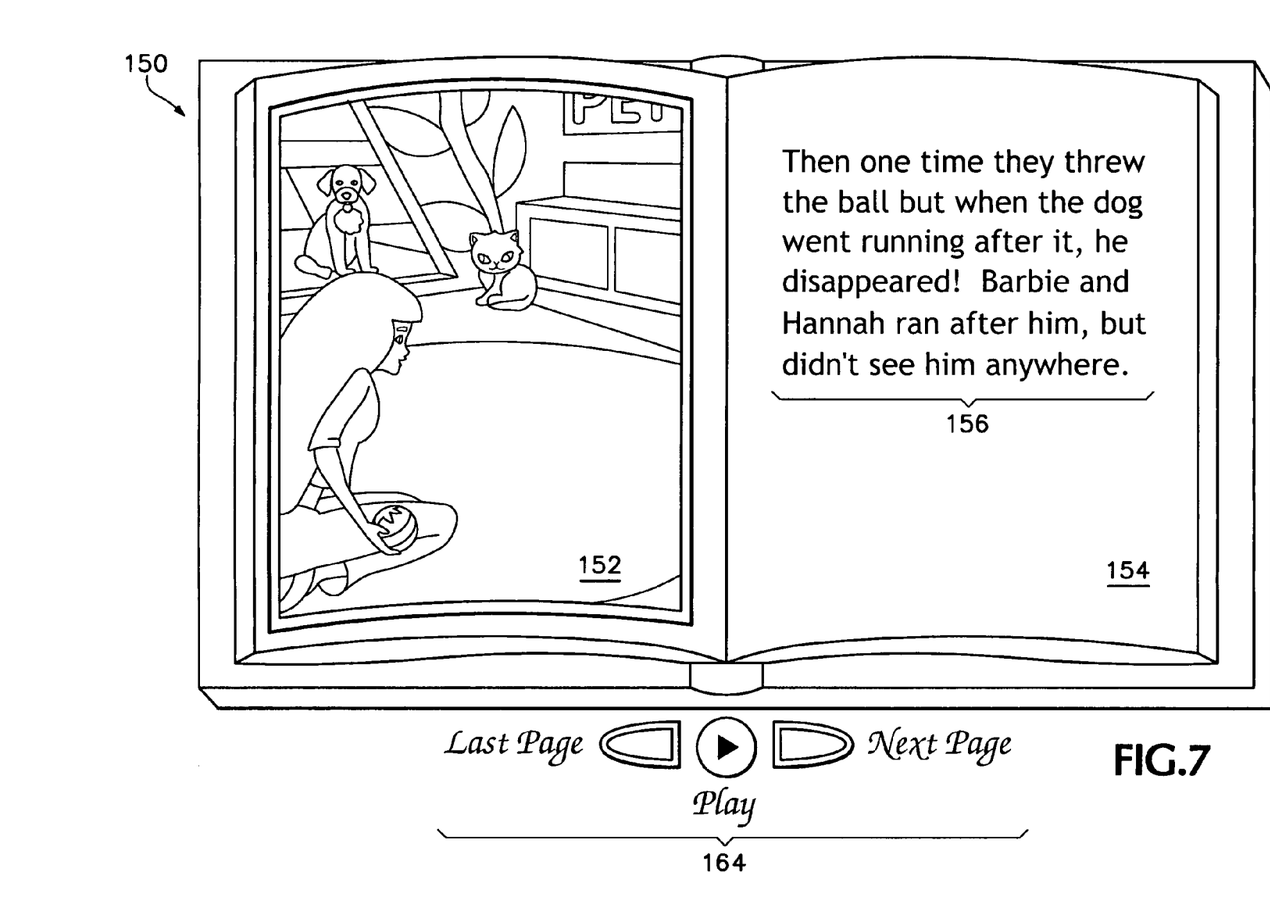
FIG. 7 depicts a graphical representation of the online storybook pages of FIG. 6 after animation of the animated image has been triggered by a user.

FIG. 7 shows storybook 150 and pages 152 and 154 after a user has triggered animation of animated image 162. In general, a triggered animated image may be configured to undergo any animation that is suitably correlated to events described in the storybook, and in some instances an animated image may undergo animation that is K purely for the amusement of the user, in which case the animation may not be correlated to the story at all.

A storybook according to aspects of this disclosure may include two or more plot lines. Multiple plot lines may be desirable, for instance, so that a user may return to the same online site and choose the same online storybook, without seeing exactly the same storybook pages. This may retain the interest of the user for a longer period of time, increasing the user's enjoyment of the online storybook and possibly increasing the educational value of the storybook in teaching the user reading skills. In storybook embodiments having multiple plot lines, the navigation mechanism may be configured to allow the user to navigate through pages corresponding to a different one of the available plot lines with each successive use of the storybook, until the user has navigated through pages corresponding to all of the available plot lines. Information about a user's past history of accessing particular plot lines of an online storybook may be saved in a user profile, as an internet "cookie", or in any other suitable manner.

Figure 8:
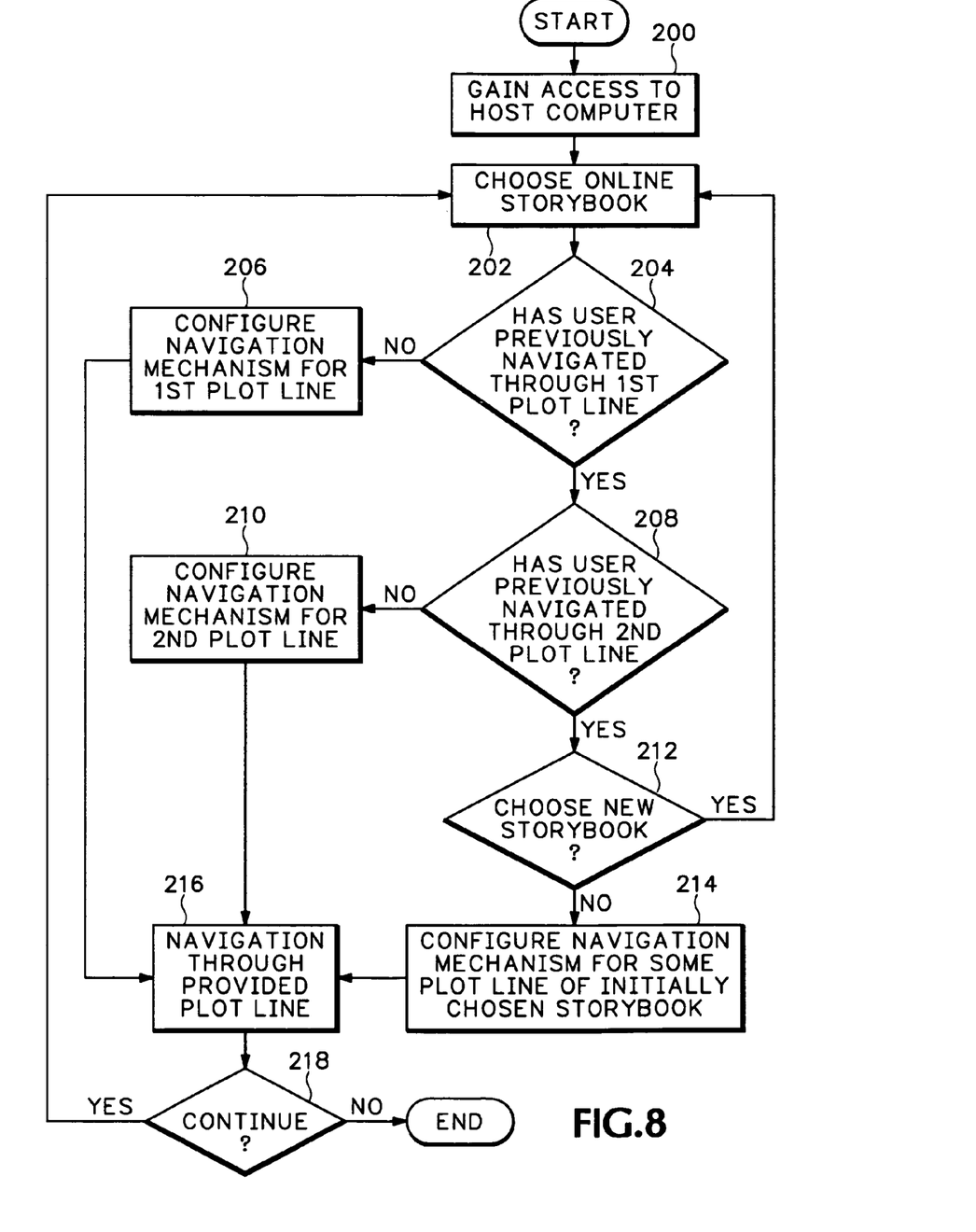
FIG. 8 is a flowchart depicting the logical structure of an embodiment of an online storybook that includes two or more plot lines.

FIG. 8 shows a flowchart depicting an embodiment of a system and method of accessing an online storybook configured to have multiple plot lines. It should be appreciated that online storybooks including multiple plot lines may also include customization and/or animation features such as those previously described in this disclosure, among others. In a first step 200, a user accesses an online host computer and is given an option to access one or more online storybooks. This may be accomplished, for example, by the user providing login information, or it may occur automatically or semi-automatically as a result of a "cookie" or other information stored on the user's computer from past online activities being transmitted to the host computer. Access to online storybooks may be freely granted, or it may require payment by the user either on a subscription basis, as a one-time fee, or using any other suitable payment method.

In a second step 202, the user chooses which of the available online storybooks to access. In this example, the chosen storybook includes graphical representations of pages corresponding to two plot lines. For example, pages 1, 3, 5, and 7 of the storybook may correspond to a first plot line, and pages 1, 2, 4, and 6 may correspond to a second plot line. The various plot lines may include one or more pages in common, or the pages may all be distinct. In a third step 204, the online host computer determines whether the user has previously accessed the chosen storybook. This information, like the user's identifying information, may be stored on the host computer and retrieved when the user logs in to the online forum, or it may be stored as a "cookie" on the user's computer, or both.

As indicated at step 206, if the user has not previously accessed the storybook, or has previously accessed the storybook but has not completely navigated through the pages corresponding to the first plot line, the host computer may configure the navigation mechanism of the storybook to provide access to the pages of the storybook corresponding to the first plot line. On the other hand, as indicated at steps 208 and 210, if the user has previously accessed the storybook and has completely navigated through the pages corresponding to the first plot line, but has not yet navigated through the pages corresponding to the second plot line, the host computer may configure the navigation mechanism to provide access to the pages corresponding to the second plot line.

As indicated at step 212, if the user has previously completely navigated through the pages corresponding to all of the available plot lines of the initially chosen storybook, the host computer may prompt the user to choose whether to access a different storybook, or to repeat a previously accessed plot line of the current storybook. If the user chooses to access a different online storybook, the host computer may provide a list of available storybooks in a repetition of step 204, followed by verification of the user's prior access of that storybook and configuration of the navigation mechanism in a repetition of steps 206, 208, 210, and 212.

As indicated at step 214, if the user chooses to repeat a previously accessed plot line of the initially chosen storybook, the host computer may configure the navigation mechanism to provide access to the first plot line of that storybook, to a randomly determined plot line, to the plot line accessed longest ago by the user, or to a plot line chosen by any other suitable mechanism. At step 216, the user may navigate through the provided plot line, using the navigation mechanism that has now been configured to provide access to the particular graphical page representations corresponding to that plot line.

Finally, as indicated at step 218, after the user has navigated through a plot line (i.e., read a story), the host computer may prompt the user to determine if the user wishes to continue with another story. If so, the host computer may provide the user with a list of available storybooks in a repetition of step 204. If not, the user may be logged out of the system, or access to the online storybooks may be discontinued in any other suitable manner.

While the present description has been provided with reference to the foregoing embodiments, those skilled in the art will understand that many variations may be made therein without departing from the spirit and scope defined in the following claims. The description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding, two or more such elements.

I claim:

1. An online reading system comprising:
    a computer-displayed graphical representation of a plurality of pages of an online storybook corresponding to at least two plot lines, each page corresponding to each plot line including one or more of text and an image;
    a customization mechanism configured to allow the user to customize the storybook by including at least one physical attribute of the user in an image and by including at least one attribute of the user in the text, such that when the customization mechanism is used, at least one page includes text that includes at least one attribute of the user and at least one page includes a representation of the user by providing an image correlated with the text and represented with a physical attribute of the user including hair;
    a navigation mechanism configured to allow a user to navigate through selected pages of the storybook corresponding to one of the plot lines each time the user accesses the reading system, the navigation mechanism being further configured to allow the user to navigate through pages corresponding to a different one of the at least two plot lines with each successive use of the system and save the user's history of accessing each plot line until the user has navigated through pages corresponding to all of the plot lines;
    wherein at least one of the images is an animated image, and wherein animation of the animated image is selectively triggered by the user, 2. The online reading system of claim 1, wherein the attribute of the user is the user's first name.

3. The online reading system of claim 1, wherein the customization mechanism is configured to allow the user to enter the at least one attribute alphanumerically using a computer keyboard.

4. The online reading system of claim 1, wherein the customization mechanism is configured to allow the user to select the at least one attribute from a list of attributes provided by the reading system.

5. The online reading system of claim 1, wherein the at least one attribute includes a favorite color.

6. The online reading system of claim 1, wherein the at least one attribute includes a favorite type of animal.

7. The online reading system of claim 1, wherein the at least one attribute includes a name for a pet animal.

8. The online reading system of claim 1, wherein the at least one attribute includes text describing a physical attribute of the user.

9. The online reading system of claim 8, wherein the text describing a physical attribute is the user's age.

10. The online reading system of claim 8, wherein the text describing a physical attribute is the user's eye color.

11. The online reading system of claim 1, wherein the text describing a physical attribute is the user's hair color.

12. The online reading system of claim 1, wherein animation of the at least one animated image is selectively triggered by positioning a graphical cursor on the animated image and clicking a mouse button.

13. The online reading system of claim 1, wherein animation of the at least one animated image is selectively triggered by pressing a key on a computer keyboard.

14. A method of providing an online storybook having multiple plot lines, the method comprising:
    connecting an online host computer to a user's computer;
    providing an option for user access one or more online storybooks;
    accepting user identification information;
    accepting user input to access a chosen online storybook;
    determining whether the accepted user information indicates that the user has previously accessed the chosen online storybook;
    providing a listing of available online storybook plot lines to the user based on this determination;
    configuring a navigation mechanism for a selected online storybook plot line;
    providing a customization mechanism configured to allow a user to customize the chosen online storybook;
    accepting user input through the customization mechanism, the user input corresponding to one or more user attributes;
    selecting a graphical representation of a page of the chosen online storybook, the page including one or more text and one or more image;
    incorporating one or more user attributes of the user input into the text and the image of the graphical representation;

displaying the graphical representation incorporating the one or more attributes of user input;

determining, after the user has navigated through the selected online storybook plot line, whether to continue with another online storybook plot line; and modifying the user information to indicate which online storybook plot lines the user has accessed.

15. The method of claim 14, wherein accepting user identification information includes accepting user login information.

16. The method of claim 14, wherein accepting user identification information includes accessing information stored on a user's computer.

17. The method of claim 14, further including accepting payment from a user.

18. The method of claim 14, wherein configuring a navigation mechanism for a selected online storybook plot line includes randomly selecting an online storybook plot line.

19. The method of claim 18, wherein randomly selecting an online storybook plot line includes randomly selecting from the online storybook plot lines not previously accessed by the user.

20. The method of claim 14, wherein configuring a navigation mechanism for a selected online storybook plot line includes accepting user input to access a chosen online storybook plot line.

* * * * *